(12) United States Patent
Wang et al.

(10) Patent No.: US 11,638,272 B2
(45) Date of Patent: Apr. 25, 2023

(54) USER-EQUIPMENT-COORDINATION-SET SELECTIVE PARTICIPATION

(71) Applicant: Google LLC, Mountain View, CA (US)

(72) Inventors: Jibing Wang, San Jose, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 45 days.

(21) Appl. No.: 16/969,105

(22) PCT Filed: Sep. 19, 2019

(86) PCT No.: PCT/US2019/052005
§ 371 (c)(1),
(2) Date: Aug. 11, 2020

(87) PCT Pub. No.: WO2021/054964
PCT Pub. Date: Mar. 25, 2021

(65) Prior Publication Data
US 2021/0345358 A1 Nov. 4, 2021

(51) Int. Cl.
*H04W 72/12* (2009.01)
*H04W 72/121* (2023.01)
*H04W 76/27* (2018.01)

(52) U.S. Cl.
CPC ........ *H04W 72/121* (2013.01); *H04W 76/27* (2018.02)

(58) Field of Classification Search
CPC .... H04W 72/121; H04W 76/15; H04B 7/024; H04B 7/026
See application file for complete search history.

(56) References Cited

U.S. PATENT DOCUMENTS

| 6,665,521 B1 | 12/2003 | Gorday et al. |
| 6,898,430 B1 | 5/2005 | Liberti et al. |

(Continued)

FOREIGN PATENT DOCUMENTS

| CN | 101764634 | 6/2010 |
| CN | 101867451 | 10/2010 |

(Continued)

OTHER PUBLICATIONS

"Non-Final Office Action", U.S. Appl. No. 16/963,623, dated Jan. 5, 2022, 12 pages.

(Continued)

*Primary Examiner* — Kevin Kim
(74) *Attorney, Agent, or Firm* — Colby Nipper PLLC

(57) ABSTRACT

This document describes methods, devices, systems, and means for user-equipment-coordination-set (404) selective participation in which a coordinating user equipment (111) determines which user equipments in the user-equipment-coordination-set (404) participate in a joint communication with a base station (121). The coordinating user equipment (111) receives an indication from the base station (121) specifying multiple user equipments to include in the user-equipment-coordination set (702) and determines a first subset of the multiple user equipments to participate in the joint communication with the base station (121) (704). The coordinating user equipment (111) transmits one or more joint-communication-selection messages to the first subset of the multiple user equipments that directs the first subset of the multiple user equipments to participate in the joint communication with the base station (121) (706).

21 Claims, 7 Drawing Sheets

(56) References Cited

U.S. PATENT DOCUMENTS

| | | |
|---|---|---|
| 9,210,550 B2 | 12/2015 | Koc et al. |
| 9,253,783 B2 | 2/2016 | Wang et al. |
| 9,271,194 B2 | 2/2016 | Lu et al. |
| 9,344,159 B2 | 5/2016 | Zhuang |
| 9,780,842 B2 | 10/2017 | Boudreau et al. |
| 9,941,939 B2 | 4/2018 | Parl et al. |
| 9,985,750 B2 | 5/2018 | Maaref et al. |
| 10,045,376 B2 | 8/2018 | Yang et al. |
| 10,178,696 B2 | 1/2019 | Cheng et al. |
| 10,201,003 B2 | 2/2019 | Guo et al. |
| 10,218,422 B2 | 2/2019 | Raghavan et al. |
| 10,412,691 B1 | 9/2019 | Marupaduga et al. |
| 10,542,556 B2 | 1/2020 | Mallik |
| 10,893,572 B2 | 1/2021 | Wang et al. |
| 11,350,439 B2 | 5/2022 | Wang et al. |
| 2004/0203973 A1 | 10/2004 | Khan |
| 2004/0233858 A1 | 11/2004 | Karaoguz |
| 2007/0223423 A1 | 9/2007 | Kim et al. |
| 2010/0027487 A1 | 2/2010 | Ihm et al. |
| 2010/0103983 A1 | 4/2010 | Wang et al. |
| 2010/0297993 A1 | 11/2010 | Heo et al. |
| 2011/0124294 A1 | 5/2011 | Dwyer et al. |
| 2011/0158117 A1 | 6/2011 | Ho et al. |
| 2012/0102409 A1* | 4/2012 | Fan ............... G06Q 20/321 |
| | | 715/738 |
| 2012/0120821 A1 | 5/2012 | Kazmi et al. |
| 2012/0157139 A1 | 6/2012 | Noh et al. |
| 2012/0236735 A1 | 9/2012 | Nory et al. |
| 2012/0264443 A1 | 10/2012 | Ng et al. |
| 2013/0034136 A1 | 2/2013 | Park et al. |
| 2013/0041954 A1* | 2/2013 | Kim ............... H04L 65/1069 |
| | | 709/204 |
| 2013/0107848 A1 | 5/2013 | Kang et al. |
| 2013/0130684 A1 | 5/2013 | Gomes et al. |
| 2013/0138817 A1 | 5/2013 | Zhang et al. |
| 2013/0150106 A1 | 6/2013 | Bucknell et al. |
| 2013/0182628 A1 | 7/2013 | Gholmieh et al. |
| 2013/0225184 A1 | 8/2013 | Liu et al. |
| 2013/0329711 A1* | 12/2013 | Seo ............... H04W 72/0406 |
| | | 370/336 |
| 2014/0010131 A1 | 1/2014 | Gaal et al. |
| 2014/0029591 A1 | 1/2014 | Anderson |
| 2014/0127991 A1 | 5/2014 | Lim et al. |
| 2014/0148168 A1 | 5/2014 | Aoyagi et al. |
| 2014/0169261 A1 | 6/2014 | Ming et al. |
| 2014/0177456 A1 | 6/2014 | Boudreau et al. |
| 2014/0226575 A1 | 8/2014 | Davydov et al. |
| 2014/0274081 A1 | 9/2014 | Comeau et al. |
| 2014/0321433 A1 | 10/2014 | Xiao et al. |
| 2015/0043390 A1 | 2/2015 | Wang et al. |
| 2015/0098397 A1 | 4/2015 | Damnjanovic et al. |
| 2015/0110040 A1 | 4/2015 | Zhao |
| 2015/0139197 A1 | 5/2015 | He et al. |
| 2015/0139203 A1 | 5/2015 | Miryala et al. |
| 2015/0163822 A1 | 6/2015 | Guo et al. |
| 2015/0195795 A1 | 7/2015 | Loehr et al. |
| 2015/0288427 A1 | 10/2015 | Wang et al. |
| 2015/0358860 A1 | 12/2015 | Lu et al. |
| 2015/0373730 A1 | 12/2015 | Fujishiro et al. |
| 2015/0382142 A1 | 12/2015 | Kim et al. |
| 2016/0007138 A1 | 1/2016 | Palanisamy et al. |
| 2016/0021526 A1 | 1/2016 | Niu et al. |
| 2016/0044634 A1 | 2/2016 | Seo et al. |
| 2016/0057604 A1 | 2/2016 | Luo et al. |
| 2016/0128123 A1 | 5/2016 | Li |
| 2016/0174278 A1 | 6/2016 | Gao et al. |
| 2016/0192420 A1 | 6/2016 | Kim et al. |
| 2016/0192433 A1 | 6/2016 | Deenoo et al. |
| 2016/0227463 A1 | 8/2016 | Baligh et al. |
| 2016/0323832 A1 | 11/2016 | Love et al. |
| 2017/0070931 A1 | 3/2017 | Huang et al. |
| 2017/0078333 A1 | 3/2017 | Tevlin |
| 2017/0086061 A1 | 3/2017 | Huang et al. |
| 2017/0188206 A1 | 6/2017 | Schmitt et al. |
| 2017/0188406 A1 | 6/2017 | Baligh et al. |
| 2017/0230986 A1 | 8/2017 | Moon et al. |
| 2017/0265227 A1 | 9/2017 | Wang et al. |
| 2017/0332389 A1 | 11/2017 | Sun et al. |
| 2017/0339530 A1 | 11/2017 | Maaref |
| 2017/0359759 A1 | 12/2017 | Brown et al. |
| 2018/0020444 A1 | 1/2018 | Lee et al. |
| 2018/0027393 A1 | 1/2018 | Yang et al. |
| 2018/0115932 A1 | 4/2018 | Gomes et al. |
| 2018/0145805 A1 | 5/2018 | Maaref |
| 2018/0146471 A1 | 5/2018 | Xu et al. |
| 2018/0184386 A1 | 6/2018 | Heo et al. |
| 2018/0235020 A1 | 8/2018 | Maaref |
| 2018/0317130 A1 | 11/2018 | Jin et al. |
| 2018/0352511 A1 | 12/2018 | Martin et al. |
| 2019/0007844 A1 | 1/2019 | Müller et al. |
| 2019/0037560 A1 | 1/2019 | Huang et al. |
| 2019/0075604 A1 | 3/2019 | Wang et al. |
| 2019/0081657 A1 | 3/2019 | Zeng et al. |
| 2019/0082428 A1 | 3/2019 | Maaref et al. |
| 2019/0174346 A1 | 6/2019 | Murray et al. |
| 2019/0174472 A1 | 6/2019 | Lee et al. |
| 2019/0208539 A1 | 7/2019 | Christoffersson et al. |
| 2019/0261443 A1 | 8/2019 | Baligh et al. |
| 2019/0312616 A1 | 10/2019 | Christoffersson et al. |
| 2020/0015192 A1 | 1/2020 | Chun |
| 2020/0037119 A1 | 1/2020 | Yang |
| 2020/0092685 A1 | 3/2020 | Fehrenbach et al. |
| 2020/0120649 A1 | 4/2020 | Nimbalker et al. |
| 2020/0137754 A1 | 4/2020 | Kim et al. |
| 2020/0154442 A1 | 5/2020 | Zhou |
| 2020/0374970 A1 | 11/2020 | Wang et al. |
| 2021/0029516 A1 | 1/2021 | Wang et al. |
| 2021/0345381 A1 | 11/2021 | Wang et al. |
| 2021/0385903 A1 | 12/2021 | Wang et al. |
| 2022/0006493 A1 | 1/2022 | Wang et al. |
| 2022/0086653 A1 | 3/2022 | Wang et al. |
| 2022/0191967 A1 | 6/2022 | Wang et al. |
| 2022/0394725 A1 | 12/2022 | Wang et al. |

FOREIGN PATENT DOCUMENTS

| | | | |
|---|---|---|---|
| CN | 103313197 | 9/2013 | |
| CN | 104429142 | 3/2015 | |
| CN | 106304348 | 1/2017 | |
| EP | 2953393 | 12/2015 | |
| EP | 3282786 | 2/2018 | |
| EP | 3425936 | 1/2019 | |
| GB | 2562109 | 11/2018 | |
| KR | 20080089457 | 10/2008 | |
| KR | 20090118058 | 11/2009 | |
| WO | 0237771 | 5/2002 | |
| WO | 2008147654 | 12/2008 | |
| WO | 2013057047 | 4/2013 | |
| WO | 2013091229 | 6/2013 | |
| WO | 2014074919 | 5/2014 | |
| WO | 2014179958 | 11/2014 | |
| WO | 2015074270 | 5/2015 | |
| WO | WO-2015123405 A1 * | 8/2015 | ............ H04H 20/38 |
| WO | 2015163798 | 10/2015 | |
| WO | 2016081375 | 5/2016 | |
| WO | 2017023785 | 2/2017 | |
| WO | 2017148173 | 9/2017 | |
| WO | 2018010818 | 1/2018 | |
| WO | 2016163206 | 2/2018 | |
| WO | 2018020015 | 2/2018 | |
| WO | 2018031770 | 2/2018 | |
| WO | 2018130115 | 7/2018 | |
| WO | 2018169343 | 9/2018 | |
| WO | 2018192699 | 10/2018 | |
| WO | 2018202797 | 11/2018 | |
| WO | 2018202798 | 11/2018 | |
| WO | 2019001039 | 1/2019 | |
| WO | 2019016141 | 1/2019 | |
| WO | 2020113010 | 6/2020 | |
| WO | 2020139811 | 7/2020 | |
| WO | 2020172022 | 8/2020 | |
| WO | 2020223010 | 11/2020 | |
| WO | 2020236429 | 11/2020 | |
| WO | WO-2021002859 A1 * | 1/2021 | |

(56) References Cited

FOREIGN PATENT DOCUMENTS

| WO | 2021029879 | 2/2021 |
| WO | 2021080666 | 4/2021 |
| WO | 2021159491 | 8/2021 |

OTHER PUBLICATIONS

"Notice of Allowance", U.S. Appl. No. 16/969,539, dated Dec. 30, 2021, 8 pages.
"International Preliminary Report on Patentability", Application No. PCT/US2019/063620, dated May 25, 2021, 8 pages.
"Written Opinion", PCT Application No. PCT/US2020/031716, dated Mar. 25, 2021, 6 pages.
"International Preliminary Report on Patentability", Application No. PCT/US2019/068265, dated Jan. 18, 2021, 33 pages.
"International Preliminary Report on Patentability", Application No. PCT/US2020/045777, dated Jun. 21, 2021, 8 pages.
"International Preliminary Report on Patentability", Application No. PCT/US2020/031716, dated Jul. 30, 2021, 7 pages.
"International Preliminary Report on Patentability", Application No. PCT/US2020/017930, dated Aug. 10, 2021, 9 pages.
"Non-Final Office Action", U.S. Appl. No. 16/969,539, dated Sep. 16, 2021, 13 pages.
"Written Opinion", Application No. PCT/US2020/031716, dated Aug. 20, 2021, 6 pages.
"Corrected Notice of Allowance", U.S. Appl. No. 16/419,854, dated Dec. 16, 2020, 2 pages.
"International Search Report and Written Opinion", Application No. PCT/US2020/045777, dated Oct. 9, 2020, 13 pages.
"Notice of Allowance", U.S. Appl. No. 16/419,854, dated Nov. 5, 2020, 11 pages.
"International Search Report and Written Opinion", Application No. PCT/US2020/031716, dated Jul. 20, 2020, 14 pages.
"Written Opinion", Application No. PCT/US2019/068265, dated Sep. 25, 2020, 20 pages.
"Evolved Universal Terrestrial Radio Access (E-UTRA)—Medium Access Control (MAC) Protocol Specification", 3GPP TS 36.321 Version 12.5. Release 12, Apr. 2015, 79 pages.
"Foreign Office Action", TW Application No. 20209124827, dated Sep. 17, 2021, 13 pages.
"International Preliminary Report on Patentability", Application No. PCT/US2020/031716, dated Oct. 15, 2021, 7 pages.
Tavanpour, "Upload User Collaboration in the Data Upload for LTE-Advanced Networks", Carleton University, Ottawa, Ontario, Jan. 2016, 199 pages.
"3GPP TS 24.501 V16.3.0", 3GPP TS 24.501 version 16.3.0, Dec. 2019, 645 pages.
"3rd Generation Partnership Project; Technical Specification Group Services and System Aspects; Security architecture and procedures for 5G system", 3GPP TS 33.501 version 16.1.0 Release 16, Dec. 2019, 202 pages.
"5G; Non-Access-Stratum (NAS) protocol for 5G System (5GS); Stage 3", 3GPP TS 24.501 version 15.1.0 Release 15, Oct. 2018, 406 pages.
"Discussion on NR Beamforming with UE-Group-Specific Beam Sweeping", 3GPP TSG-RAN WG1 Meeting #86 R1-166219; Gothenburg, Sweden, Aug. 22-26, 2016, 7 pages.
"International Search Report and Written Opinion", PCT Application No. PCT/US2019/043355, dated Mar. 31, 2020, 12 pages.
"International Search Report and Written Opinion", PCT Application No. PCT/US2019/063620, dated Mar. 9, 2020, 14 pages.
"International Search Report and Written Opinion", PCT Application No. PCT/US2019/046374, dated Apr. 14, 2020, 13 pages.
"International Search Report and Written Opinion", PCT Application No. PCT/US2019/068265, dated Apr. 29, 2020, 29 pages.
"International Search Report and Written Opinion", PCT Application No. PCT/US2019/052005, dated May 18, 2020, 14 pages.
"International Search Report and Written Opinion", PCT Application No. PCT/US2020/022460, dated May 26, 2020, 13 pages.
"International Search Report and Written Opinion", PCT Application No. PCT/US2020/017930, dated May 29, 2020, 14 pages.
"Invitation to Pay Additional Fees", PCT Application No. PCT/US2019/068265, dated Mar. 13, 2020, 13 pages.
"LTE; Evolved Universal Terrestrial Radio Access (E-UTRA); Medium Access Control (MAC) protocol specification (3GPP TS 36.321 version 15.8.0 Release 15)", ETSI TS 136 321 V15.8.0, Jan. 2020, 137 pages.
"Non-Final Office Action", U.S. Appl. No. 16/419,854, dated Jun. 30, 2020, 29 Pages.
"Third Generation Partnership Project; Technical Specification Group Services and System Aspects; Service requirements for the 5G system; Stage 1", 3GPP TS 22.261 version 16.10.0 Release 16, Dec. 2019, 72 pages.
"U.S. Appl. No. 62/785,949", filed Feb. 21, 2019.
"U.S. Appl. No. 62/785,949", filed Dec. 28, 2018.
"UE Overheating for EN-DC", 3GPP R2-1802414, UE overheating for EN-DC, in 3GPP TSG-RAN WG2 Meeting #101, Apple Inc., Mar. 2, 2018, 3 pages.
Aboba, et al., "Extensible Authentication Protocol (EAP)", RFC Editor; Retrieved from https://www.rfc-editor.org/info/rfc3748, Jun. 2004, 67 pages.
Klingenbrunn, et al., "Power Backoff Mechanism for Intermodulation Distortion and Harmonic Distortion", Technical Disclosure Commons; Retrieved from https://www.tdcommons.org/dpubs_series/3424, Jul. 13, 2020, 13 pages.
Lin, et al., "Handling of Extensible Authentication Protocol Based Non-Access Stratum Authentication Failures", Technical Disclosure Commons; Retrieved from https://www.tdcommons.org/dpubs_series/3191, Apr. 23, 2020, 11 pages.
Son, "7 Deployment Scenarios of Private 5G Networks", Netmanias; Retrieved from https://www.netmanias.com/en/post/blog/14500/5g-edge-kt-sk-telecom/7-deployment-scenarios-of-private-5g-networks, Oct. 21, 2019, 11 pages.
Wu, "Handling Overheating in a Wireless-Communication Device", Technical Disclosure Commons; Retrieved from https://www.tdcommons.org/dpubs_series/2343, Jul. 12, 2019, 22 pages.
Zhang, et al., "Grant-less Uplink Transmission for LTE Operated in Unlicensed Spectrum", Feb. 14, 2018, 6 pages.
"Foreign Office Action", EP Application No. 19756050.1, dated Jan. 24, 2022, 4 pages.
"Foreign Office Action", KR Application No. 10-2020-7022366, dated Feb. 23, 2022, 11 pages.
"Foreign Office Action", IN Application No. 202147031380, dated Mar. 8, 2022, 8 pages.
"Foreign Office Action", IN Application No. 202147025618, dated Mar. 11, 2022, 5 pages.
"Foreign Office Action", IN Application No. 202147051065, dated Mar. 28, 2022, 8 pages.
"International Preliminary Report on Patentability", Application No. PCT/US2019/043355, dated Jan. 25, 2022, 7 pages.
"International Preliminary Report on Patentability", Application No. PCT/US2019/046374, dated Feb. 8, 2022, 8 pages.
"International Preliminary Report on Patentability", Application No. PCT/US2019/052005, dated Mar. 31, 2022, 8 pages.
"Notice of Allowance", U.S. Appl. No. 16/969,539, dated Mar. 30, 2022, 5 pages.
"Notice of Allowance", U.S. Appl. No. 16/963,623, dated Jul. 25, 2022, 8 pages.
"Foreign Office Action", IN Application No. 202247022717, dated Aug. 16, 2022, 7 pages.
"Foreign Office Action", CA Application No. 3,127,384, dated Sep. 27, 2022, 4 pages.
"Foreign Office Action", IN Application No. 202247001696, dated Oct. 21, 2022, 6 pages.
"Notice of Allowance", U.S. Appl. No. 16/963,623, dated Oct. 31, 2022, 6 pages.
"Final Office Action", EP Application No. 19783187.8, dated Jan. 27, 2023, 4 pages.
"Foreign Office Action", EP Application No. 19827946.5, dated Feb. 24, 2023, 7 pages.

(56) References Cited

OTHER PUBLICATIONS

"Notice of Allowance", U.S. Appl. No. 16/963,623, dated Feb. 22, 2023, 5 pages.

* cited by examiner

USER-EQUIPMENT-COORDINATION-SET SELECTIVE PARTICIPATION

BACKGROUND

A user-equipment-coordination set (UECS) is formed by multiple user equipment assigned as a group to function together similarly to a distributed antenna for the benefit of a particular user equipment (UE). The UECS includes a coordinating UE that coordinates joint transmission and reception of downlink and/or uplink data for the particular UE (e.g., target UE) or multiple UEs in the UE-coordination set. By combining antennas and transceivers of multiple UEs in the UE-coordination set, joint communication improves the link budget for communication, as compared to a single UE communicating with the base station.

SUMMARY

This summary is provided to introduce simplified concepts of user-equipment-coordination-set selective participation. The simplified concepts are further described below in the Detailed Description. This summary is not intended to identify essential features of the claimed subject matter nor is it intended for use in determining the scope of the claimed subject matter.

In aspects, methods, devices, systems, and means for determining participation in a joint communication by a coordinating user equipment for a user-equipment-coordination set in a wireless communications network are described. The coordinating user equipment receives an indication from a base station specifying multiple user equipment to include in the user-equipment-coordination set. The coordinating user equipment determines a first subset of the multiple user equipment to participate in the joint communication with the base station. The coordinating user equipment transmits one or more joint-communication-selection messages to the first subset of the multiple user equipment, the transmitting being effective to direct the first subset of the multiple user equipment to participate in the joint communication with the base station. The coordinating user equipment participates in the joint communication, with the first subset of the multiple user equipment, to communicate data with the base station for a target user equipment in the user-equipment-coordination set.

Aspects may further comprise the coordinating user equipment: determining a second subset of the multiple user equipments, the second subset not participating in the joint communication between the user-equipment-coordination set and the base station; and transmitting one or more joint-communication-selection messages to the second subset of the multiple user equipments, the transmitting being effective to direct the second subset of the multiple user equipments to not participate in the joint communication with the base station.

Aspects may further comprise the coordinating user equipment: receiving from a first user equipment in the first subset of the multiple user equipments an indication of a change of a status of the first user equipment; determining to remove the first user equipment from participation in joint communication with the base station; and based on the determining to remove the first user equipment, transmitting a joint-communication-selection message to the first user equipment, the transmitting being effective to direct the first user equipment to discontinue participation in the joint communication with the base station.

Aspects may further comprise the coordinating user equipment: based on the determining to remove the first user equipment from participation in the joint communication, selecting a second user equipment, that is not participating in the joint communication, to participate in the joint communication with the base station; and based on the selecting the second user equipment, transmitting a joint-communication-selection message to the second user equipment, the transmitting being effective to direct the second user equipment to participate in the joint communication with the base station.

Aspects may also comprise the coordinating user equipment: determining that a first portion of the first subset of the multiple user equipments participates in joint reception; and determining that a second portion of the first subset of the multiple user equipments participates in joint transmission. The coordinating user equipment may determine that a link quality of joint reception has dropped below a minimum threshold value; and select an additional user equipment to participate in the joint communication with the base station. The coordinating user equipment may receive an indication from the base station that a link quality of joint transmission has dropped below a minimum threshold value; and select an additional user equipment, that is not participating in the joint communication, to participate in joint communication with the base station.

BRIEF DESCRIPTION OF THE DRAWINGS

The details of one or more aspects of user-equipment-coordination-set selective participation are described below. The use of the same reference numbers in different instances in the description and the figures indicate similar elements.

DETAILED DESCRIPTION

Figure 1:
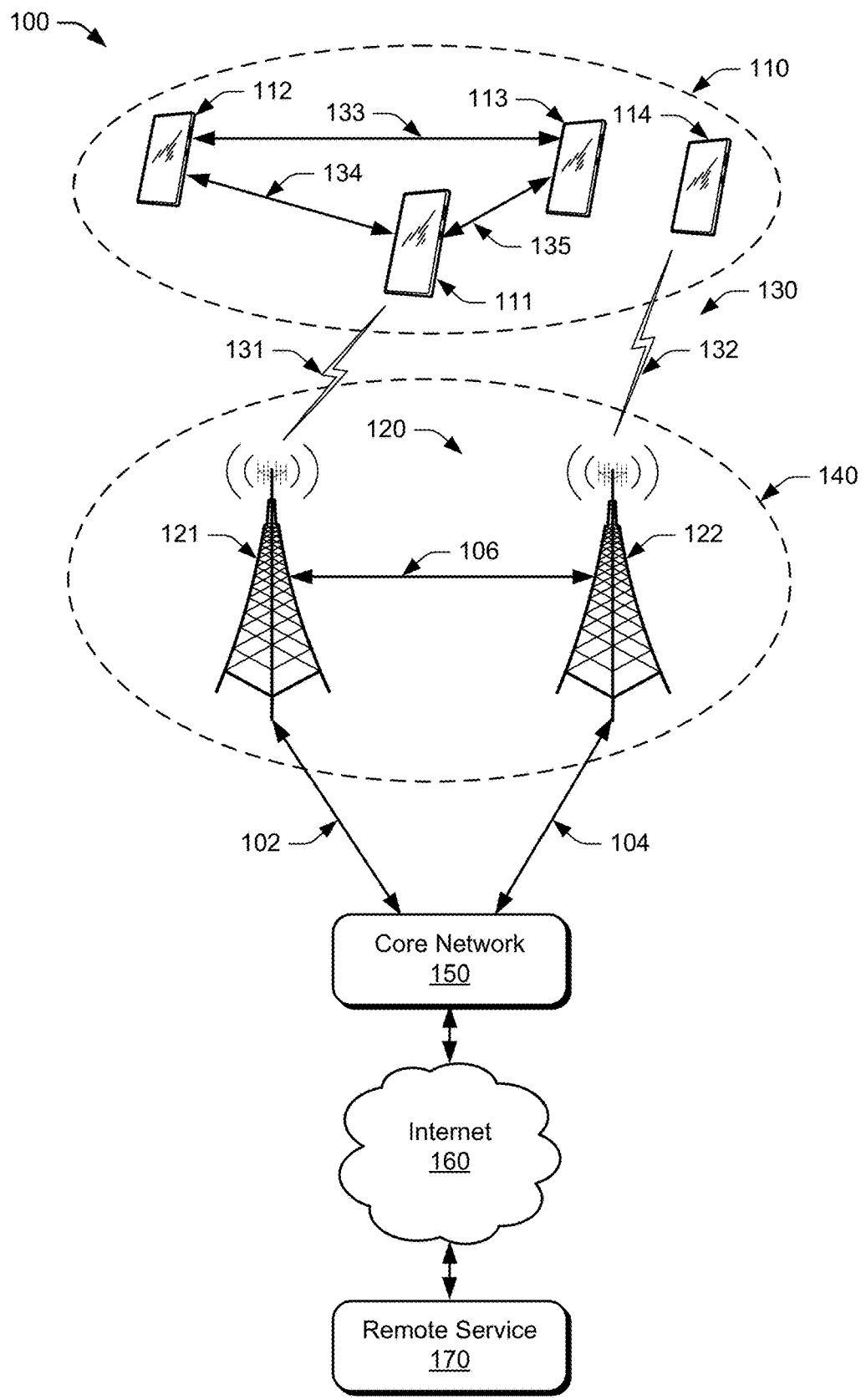
FIG. 1 illustrates an example operating environment in which aspects of user-equipment-coordination-set selective participation can be implemented.

This document describes methods, devices, systems, and means for user-equipment-coordination-set selective participation that facilitates more-efficient operation of a UECS that includes user equipments that are in a mixture of Radio Resource Control (RRC) modes (states) or that have varying capabilities, such as battery capacity. A coordinating user equipment determines which user equipments in the user-equipment-coordination-set participate in a joint communication with a base station. The coordinating user equipment receives an indication from the base station specifying multiple user equipments to include in the user-equipment-coordination set and determines a first subset of the multiple user equipments to participate in the joint communication with the base station. The coordinating user equipment transmits one or more joint-communication-selection messages to the first subset of the multiple user equipments that directs the first subset of the multiple user equipments to participate in the joint communication with the base station.

A UE-coordination set is formed by multiple UEs assigned as a group to function together, similarly to a distributed antenna, for the benefit of a particular UE. The UE-coordination set includes a coordinating UE that coordinates joint transmission and reception of downlink and/or uplink data for the particular UE (e.g., target UE) or multiple UEs in the UE-coordination set. By combining antennas and transmitters of multiple UEs in the UE-coordination set, the effective transmit power of the particular UE is significantly increased, and the effective signal quality is greatly improved.

Multiple UEs can each receive downlink data transmissions from the base station. Unlike conventional relay techniques, these UEs do not decode the downlink transmissions into data packets and then forward the data packets to a destination. Rather, the UEs demodulate and sample the downlink transmissions to produce I/Q samples. The UEs determine where to forward the I/Q samples of the downlink transmissions, such as to a coordinating UE or a target UE for decoding. In aspects, the target UE may be included in a subset of target UEs within the UE-coordination set. The coordinating UE (or the target UE) receives the I/Q samples from the other UEs in the UE-coordination set and stores the I/Q samples in a buffer memory for decoding. Then, the coordinating UE (or the target UE) synchronizes and decodes the stored I/Q samples into data packets for the target UE(s). Accordingly, the processing of the I/Q samples occurs at the coordinating UE or the target UE. In this way, the UE-coordination set acts as a distributed antenna for the target UE. The target UE includes its own antenna(s) and participates in the reception, demodulation, and sampling of downlink transmissions from the base stations and forwards the sampled I/Q data to the coordinating UE. However, if the target UE is the coordinating UE, then the target UE does not forward the I/Q samples to itself.

In one use case, multiple UEs can form a UE-coordination set to transmit a message to a base station at a higher effective transmit power than would be possible for an individual UE. Additionally, those UEs can form a UE-coordination set to receive a message from the base station for one of the UEs with greater effective receive sensitivity than would be possible for an individual UE. One of the multiple UEs acts as a coordinating UE for the UE-coordination set to aggregate data signals intended for a target UE and received by the UE-coordination set. Each of the UEs demodulates and samples the radio frequency signals and forwards the baseband samples to the coordinating UE using a local wireless network. Then, the coordinating UE aggregates and processes the samples to generate decoded data and provides the decoded data to the target UE. Alternatively, the coordinating UE can forward the stored samples to the target UE to allow the target UE to decode the data.

In aspects, a UECS includes UEs in a mixture of RRC modes, such as one or more UEs in an engaged mode (e.g., connected mode) and/or one or more UEs in a disengaged mode (e.g., idle mode or inactive mode). The coordinating UE of a UECS may select a subset of the UEs for any given joint transmission or joint reception. For example, the coordinating UE can select the subset of UEs that are in the engaged mode to perform joint communication (e.g., joint transmission and/or joint reception). The target UE for the joint communication can be a UE in any RRC mode. For example, the engaged mode UEs can conduct joint communication for a target UE that is in the engaged mode or in the disengaged mode.

In other aspects, the coordinating UE or a base station managing the UECS can select or deselect a UE in the UECS to participate in joint communication based on the battery status (e.g., remaining battery capacity or battery level) of the UE. For example, periodically or based on the battery level dropping below a low-power-indicator threshold value, the UE reports the level of its remaining battery capacity to the coordinating UE or base station. If the UE that is selected for participation in joint communication sends an indication that indicates a low battery level, the coordinating UE or base station may deselect the UE from participation in joint communication. The UE may be selected or deselected for joint communication based on battery level regardless of the RRC mode of the UE.

In further aspects, the coordinating UE or the base station sends a joint-communication-selection message to a particular UE to indicate to the UE that the UE is selected or deselected to participate in joint transmission and/or joint reception. The joint-communication-selection message includes an indication that the UE is to participate in joint reception, joint transmission, both joint transmission and joint reception, or neither joint transmission nor joint reception.

The selection or deselection of one or more UEs for joint communication can be based on one or more factors. The base station or coordinating UE may evaluate link quality and determine to increase or decrease the number of UEs participating in joint communication based on the link quality. For example, if the base station determines that a quality of the signals received from the UECS (e.g., the received signal strength, RSSI) exceeds a threshold value, the base station commands the UECS to reduce the number of UEs participating in joint transmission. Alternatively, if the base station determines that a quality of the signals received from the UECS (e.g., the received signal strength, RSSI) drops below a minimum threshold value, the base station commands the UECS to increase the number of UEs participating in joint transmission.

When adding or removing UEs based on link quality, the base station or coordinating UE may further consider the battery status of the UEs to determine which UE to add or remove. For example, when removing a UE from joint communication, the UE with the lowest battery level is removed, or when adding a UE to joint communication, the nonparticipating UE with the greatest battery level is added. Alternatively or additionally, the coordinating UE may evaluate link quality of signals jointly-received from the base station and determine to increase or decrease the number of UEs participating in joint reception based on the link quality of signals jointly-received from the base station.

In another aspect, the coordinating UE may schedule UEs for participation in joint communication. If fewer UEs are required for joint communication than the number of UEs available for joint communication, the coordinating UE can schedule the UEs in the UECS to participate in joint communication. For example, the coordinating UE may establish a round-robin schedule for UE-participation in joint communication. The coordinating UE can base the schedule on one or more factors, such as the battery status of the UEs in the UECS, the RRC mode of the UEs in the UECS, or other capabilities or statuses of the UEs in the UECS.

In aspects, when a UE in the UECS does not participate in joint communication, the UE can still send data to the base station or receive data from the base station. The coordinating UE forwards downlink data to the nonparticipating UE that was jointly received by the UECS, and the nonparticipating UE forwards uplink data to the coordinating UE for joint transmission to the base station by the UECS. The nonparticipating UE does not need to be in the same RRC mode as the participating UEs in the UECS. For example, the nonparticipating UE may be in the disengaged mode and the participating UEs can jointly receive paging channel communications for the nonparticipating UE.

Example Environment

FIG. 1 illustrates an example environment 100, which includes multiple user equipment 110 (UE 110), illustrated as UE 111, UE 112, UE 113, and UE 114. Each UE 110 can communicate with one or more base stations 120 (illustrated as base stations 121 and 122) through one or more wireless communication links 130 (wireless link 130), illustrated as wireless links 131 and 132. Each UE 110 in a UE-coordination set (illustrated as UE 111, UE 112, and UE 113) can communicate with a coordinating UE of the UE-coordination set and/or a target UE in the UE-coordination set through one or more local wireless network connections (e.g., WLAN, Bluetooth, NFC, a personal area network (PAN), WiFi-Direct, IEEE 802.15.4, ZigBee, Thread, millimeter wavelength communication (mmWave), or the like) such as local wireless network connections 133, 134, and 135. Although illustrated as a smartphone, the UE 110 may be implemented as any suitable computing or electronic device, such as a mobile communication device, a modem, cellular phone, gaming device, navigation device, media device, laptop computer, desktop computer, tablet computer, smart appliance, vehicle-based communication system, an Internet-of-things (IoT) device (e.g., sensor node, controller/actuator node, combination thereof), and the like. The base stations 120 (e.g., an Evolved Universal Terrestrial Radio Access Network Node B, E-UTRAN Node B, evolved Node B, eNodeB, eNB, Next Generation Node B, gNode B, gNB, ng-eNB, or the like) may be implemented in a macrocell, microcell, small cell, picocell, or the like, or any combination thereof.

The base stations 120 communicate with the user equipment 110 using the wireless links 131 and 132, which may be implemented as any suitable type of wireless link. The wireless links 131 and 132 include control and data communication, such as downlink of data and control information communicated from the base stations 120 to the user equipment 110, uplink of other data and control information communicated from the user equipment 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), Fifth Generation New Radio (5G NR), and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110.

The base stations 120 are collectively a Radio Access Network 140 (e.g., RAN, Evolved Universal Terrestrial Radio Access Network, E-UTRAN, 5G NR RAN, or NR RAN). The base stations 121 and 122 in the RAN 140 are connected to a core network 150. The base stations 121 and 122 connect, at 102 and 104 respectively, to the core network 150 through an NG2 interface for control-plane signaling and using an NG3 interface for user-plane data communications when connecting to a 5G core network, or using an Si interface for control-plane signaling and user-plane data communications when connecting to an Evolved Packet Core (EPC) network. The base stations 121 and 122 can communicate using an Xn Application Protocol (XnAP) through an Xn interface or using an X2 Application Protocol (X2AP) through an X2 interface, at 106, to exchange user-plane and control-plane data. The user equipment 110 may connect, via the core network 150, to public networks, such as the Internet 160 to interact with a remote service 170.

Example Devices

Figure 2:
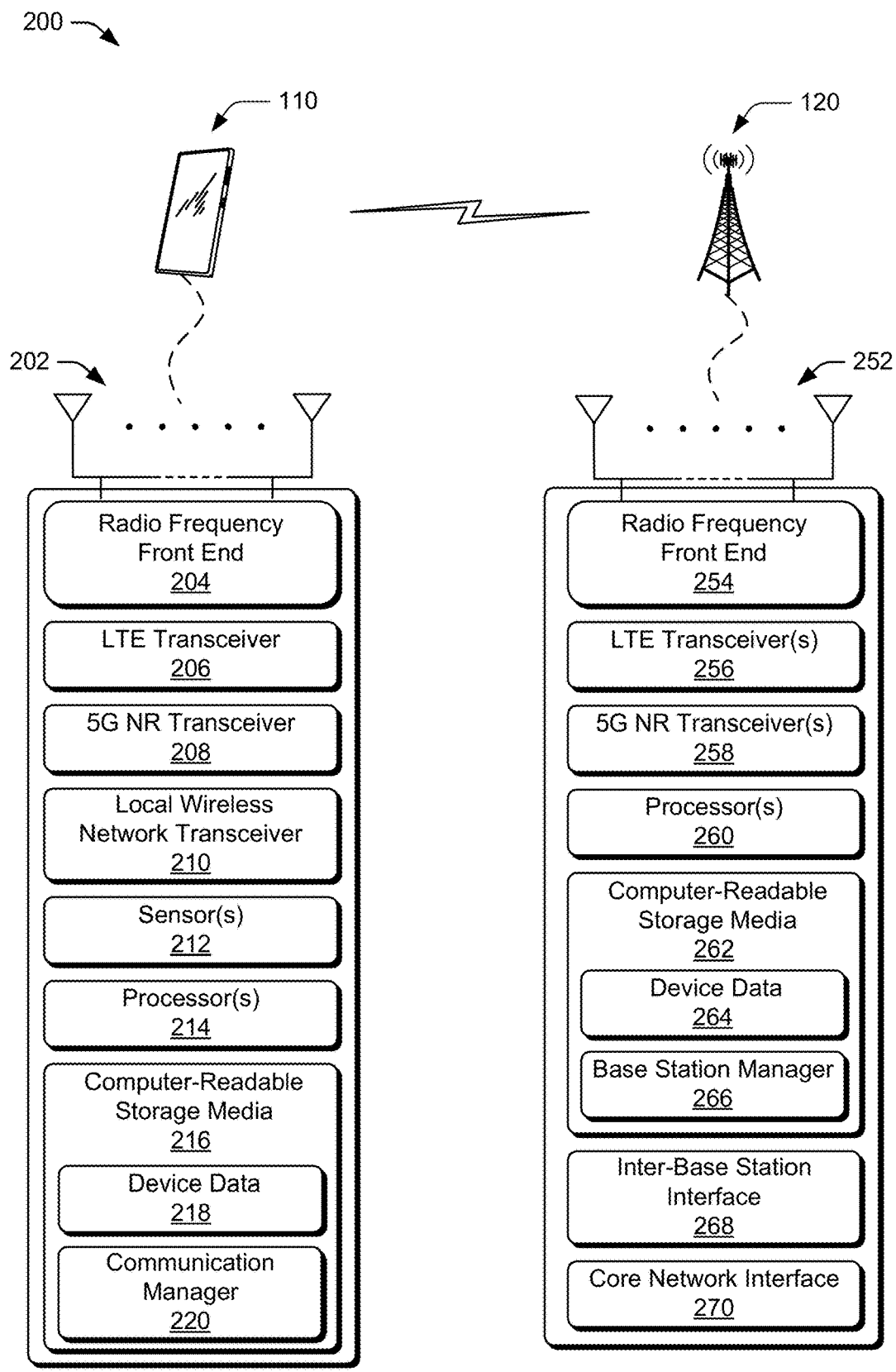
FIG. 2 illustrates an example device diagram of a user equipment and a serving cell base station.

FIG. 2 illustrates an example device diagram 200 of a user equipment and a base station. In aspects, the device diagram 200 describes devices that can implement various aspects of UE-coordination-set selective participation. Included in FIG. 2 are the multiple UE 110 and the base stations 120. The multiple UE 110 and the base stations 120 may include additional functions and interfaces that are omitted from FIG. 2 for the sake of clarity. The UE 110 includes antennas 202, a radio frequency front end 204 (RF front end 204), and radio-frequency transceivers (e.g., an LTE transceiver 206 and a 5G NR transceiver 208) for communicating with base stations 120 in the 5G RAN 141 and/or the E-UTRAN 142. The UE 110 includes one or more additional transceivers (e.g., local wireless network transceiver 210) for communicating over one or more wireless local wireless networks (e.g., WLAN, Bluetooth, NFC, a personal area network (PAN), WiFi-Direct, IEEE 802.15.4, ZigBee, Thread, mmWave, or the like) with at least the coordinating UE, and/or the target UE, of the UE-coordination set. The RF front end 204 of the UE 110 can couple or connect the LTE transceiver 206, the 5G NR transceiver 208, and the local wireless network transceiver 210 to the antennas 202 to facilitate various types of wireless communication.

The antennas 202 of the UE 110 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206, and/or the 5G NR transceiver 208. Additionally, the antennas 202, the RF front end 204, the LTE transceiver 206, and/or the 5G NR transceiver 208 may be configured to support beamforming for the transmission and reception of communications with the base stations 120. By way of example and not limitation, the antennas 202 and the RF front end 204 can be implemented for operation in sub-gigahertz bands, sub-6 GHz bands, and/or above 6 GHz bands that are defined by the 3GPP LTE and 5G NR communication standards. In addition, the RF front end 204 can be tuned to, and/or be tunable to, one or more frequency bands defined and implemented by the local wireless network transceiver 210 to support transmission and reception of communications with other UEs in the UE-coordination set over a local wireless network.

The UE 110 includes sensor(s) 212 can be implemented to detect various properties such as temperature, supplied power, power usage, battery state, or the like. As such, the sensors 212 may include any one or a combination of temperature sensors, thermistors, battery sensors, and power usage sensors.

The UE 110 also includes processor(s) 214 and computer-readable storage media 216 (CRM 216). The processor 214 may be a single core processor or a multiple core processor composed of a variety of materials, such as silicon, polysilicon, high-K dielectric, copper, and so on. The computer-readable storage media described herein excludes propagating signals. CRM 216 may include any suitable memory or storage device such as random-access memory (RAM), static RAM (SRAM), dynamic RAM (DRAM), non-volatile RAM (NVRAM), read-only memory (ROM), or Flash memory useable to store device data 218 of the UE 110. The device data 218 includes user data, multimedia data, beamforming codebooks, applications, and/or an operating system of the UE 110, which are executable by processor(s) 214 to enable user-plane communication, control-plane signaling, and user interaction with the UE 110.

CRM 216 also includes a communication manager 220 (e.g., a communication manager application 220). Alternately or additionally, the communication manager 220 may be implemented in whole or part as hardware logic or circuitry integrated with or separate from other components of the UE 110. In at least some aspects, the communication manager 220 configures the RF front end 204, the LTE transceiver 206, the 5G NR transceiver 208, and/or the local wireless network transceiver 210 to implement the techniques described herein for UE-coordination-set selective participation.

The device diagram for the base stations 120, shown in FIG. 2, includes a single network node (e.g., a gNode B). The functionality of the base stations 120 may be distributed across multiple network nodes or devices and may be distributed in any fashion suitable to perform the functions described herein. The base stations 120 include antennas 252, a radio frequency front end 254 (RF front end 254), one or more LTE transceivers 256, and/or one or more 5G NR transceivers 258 for communicating with the UE 110. The RF front end 254 of the base stations 120 can couple or connect the LTE transceivers 256 and the 5G NR transceivers 258 to the antennas 252 to facilitate various types of wireless communication. The antennas 252 of the base stations 120 may include an array of multiple antennas that are configured similar to or differently from each other. The antennas 252 and the RF front end 254 can be tuned to, and/or be tunable to, one or more frequency band defined by the 3GPP LTE and 5G NR communication standards, and implemented by the LTE transceivers 256, and/or the 5G NR transceivers 258. Additionally, the antennas 252, the RF front end 254, the LTE transceivers 256, and/or the 5G NR transceivers 258 may be configured to support beamforming, such as Massive-MIMO, for the transmission and reception of communications with any UE 110 in a UE-coordination set.

The base stations 120 also include processor(s) 260 and computer-readable storage media 262 (CRM 262). The processor 260 may be a single core processor or a multiple core processor composed of a variety of materials, such as silicon, polysilicon, high-K dielectric, copper, and so on. CRM 262 may include any suitable memory or storage device such as random-access memory (RAM), static RAM (SRAM), dynamic RAM (DRAM), non-volatile RAM (NVRAM), read-only memory (ROM), or Flash memory useable to store device data 264 of the base stations 120. The device data 264 includes network scheduling data, radio resource management data, beamforming codebooks, applications, and/or an operating system of the base stations 120, which are executable by processor(s) 260 to enable communication with the UE 110.

CRM 262 also includes a base station manager 266 (e.g., base station manager application 266). Alternately or additionally, the base station manager 266 may be implemented in whole or part as hardware logic or circuitry integrated with or separate from other components of the base stations 120. In at least some aspects, the base station manager 266 configures the LTE transceivers 256 and the 5G NR transceivers 258 for communication with the UE 110, as well as communication with a core network. The base stations 120 include an inter-base station interface 268, such as an Xn and/or X2 interface, which the base station manager 266 configures to exchange user-plane and control-plane data between another base station 120, to manage the communication of the base stations 120 with the UE 110. The base stations 120 include a core network interface 270 that the base station manager 266 configures to exchange user-plane and control-plane data with core network functions and entities.

Network Stack

Figure 3:
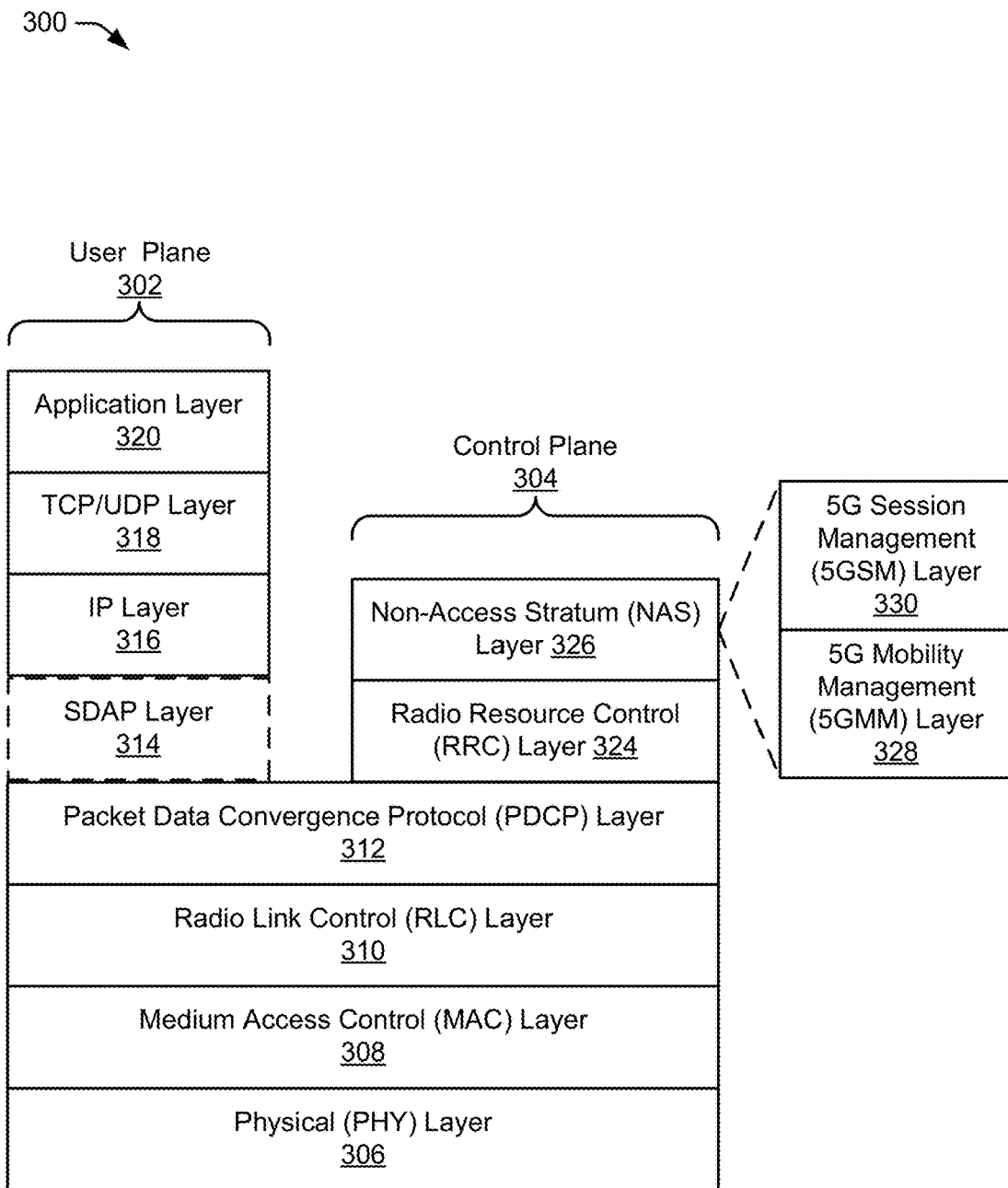
FIG. 3 illustrates an example block diagram of a wireless network stack model in which various aspects of user-equipment-coordination-set selective participation can be implemented.

FIG. 3 illustrates an example block diagram 300 of a wireless network stack model 300 (stack 300). The stack 300 characterizes a communication system for the example environment 100, in which various aspects of user-equipment-coordination-set selective participation can be implemented. The stack 300 includes a user plane 302 and a control plane 304. Upper layers of the user plane 302 and the control plane 304 share common lower layers in the stack 300. Wireless devices, such as the UE 110 or the base station 120, implement each layer as an entity for communication with another device using the protocols defined for the layer. For example, a UE 110 uses a Packet Data Convergence Protocol (PDCP) entity to communicate to a peer PDCP entity in a base station 120 using the PDCP.

The shared lower layers include a physical (PHY) layer 306, a Medium Access Control (or Media Access Control) (MAC) layer 308, a Radio Link Control (RLC) layer 310, and a PDCP layer 312. The PHY layer 306 provides hardware specifications for devices that communicate with each other. As such, the PHY layer 306 establishes how devices connect to each other, assists in managing how communication resources are shared among devices, and the like.

The MAC layer 308 specifies how data is transferred between devices. Generally, the MAC layer 308 provides a way in which data packets being transmitted are encoded and decoded into bits as part of a transmission protocol.

The RLC layer 310 provides data transfer services to higher layers in the stack 300. Generally, the RLC layer 310 provides error correction, packet segmentation and reassembly, and management of data transfers in various modes, such as acknowledged, unacknowledged, or transparent modes.

The PDCP layer 312 provides data transfer services to higher layers in the stack 300. Generally, the PDCP layer 312 provides transfer of user plane 302 and control plane 304 data, header compression, ciphering, and integrity protection.

Above the PDCP layer 312, the stack splits into the user-plane 302 and the control-plane 304. Layers of the user plane 302 include an optional Service Data Adaptation Protocol (SDAP) layer 314, an Internet Protocol (IP) layer 316, a Transmission Control Protocol/User Datagram Protocol (TCP/UDP) layer 318, and an application layer 320, which transfers data using the wireless link 106. The optional SDAP layer 314 is present in 5G NR networks. The SDAP layer 314 maps a Quality of Service (QoS) flow for each data radio bearer and marks QoS flow identifiers in uplink and downlink data packets for each packet data session. The IP layer 316 specifies how the data from the application layer 320 is transferred to a destination node. The TCP/UDP layer 318 is used to verify that data packets intended to be transferred to the destination node reached the destination node, using either TCP or UDP for data transfers by the application layer 320. In some implementations, the user plane 302 may also include a data services layer (not shown) that provides data transport services to transport application data, such as IP packets including web browsing content, video content, image content, audio content, or social media content.

The control plane 304 includes a Radio Resource Control (RRC) layer 324 and a Non-Access Stratum (NAS) layer 326. The RRC layer 324 establishes and releases connections and radio bearers, broadcasts system information, or performs power control. The RRC layer 324 also controls a resource control state of the UE 110 and causes the UE 110 to perform operations according to the resource control state. Example resource control states include a connected state (e.g., an RRC connected state) or a disconnected state, such as an inactive state (e.g., an RRC inactive state) or an idle state (e.g., an RRC idle state). In general, if the UE 110 is in the connected state, the connection with the base station 120 is active. In the inactive state, the connection with the base station 120 is suspended. If the UE 110 is in the idle state, the connection with the base station 120 is released. Generally, the RRC layer 324 supports 3GPP access but does not support non-3GPP access (e.g., WLAN communications).

The NAS layer 326 provides support for mobility management (e.g., using a Fifth-Generation Mobility Management (5GMM) layer 328) and packet data bearer contexts (e.g., using a Fifth-Generation Session Management (5GSM) layer 330) between the UE 110 and entities or functions in the core network, such as the Access and Mobility Management Function 152 (AMF 152) of the 5GC 150 or the like. The NAS layer 326 supports both 3GPP access and non-3GPP access.

In the UE 110, each layer in both the user plane 302 and the control plane 304 of the stack 300 interacts with a corresponding peer layer or entity in the base station 120, a core network entity or function, and/or a remote service, to support user applications and control operation of the UE 110 in the RAN 140.

UE-Coordination Set

Figure 4:
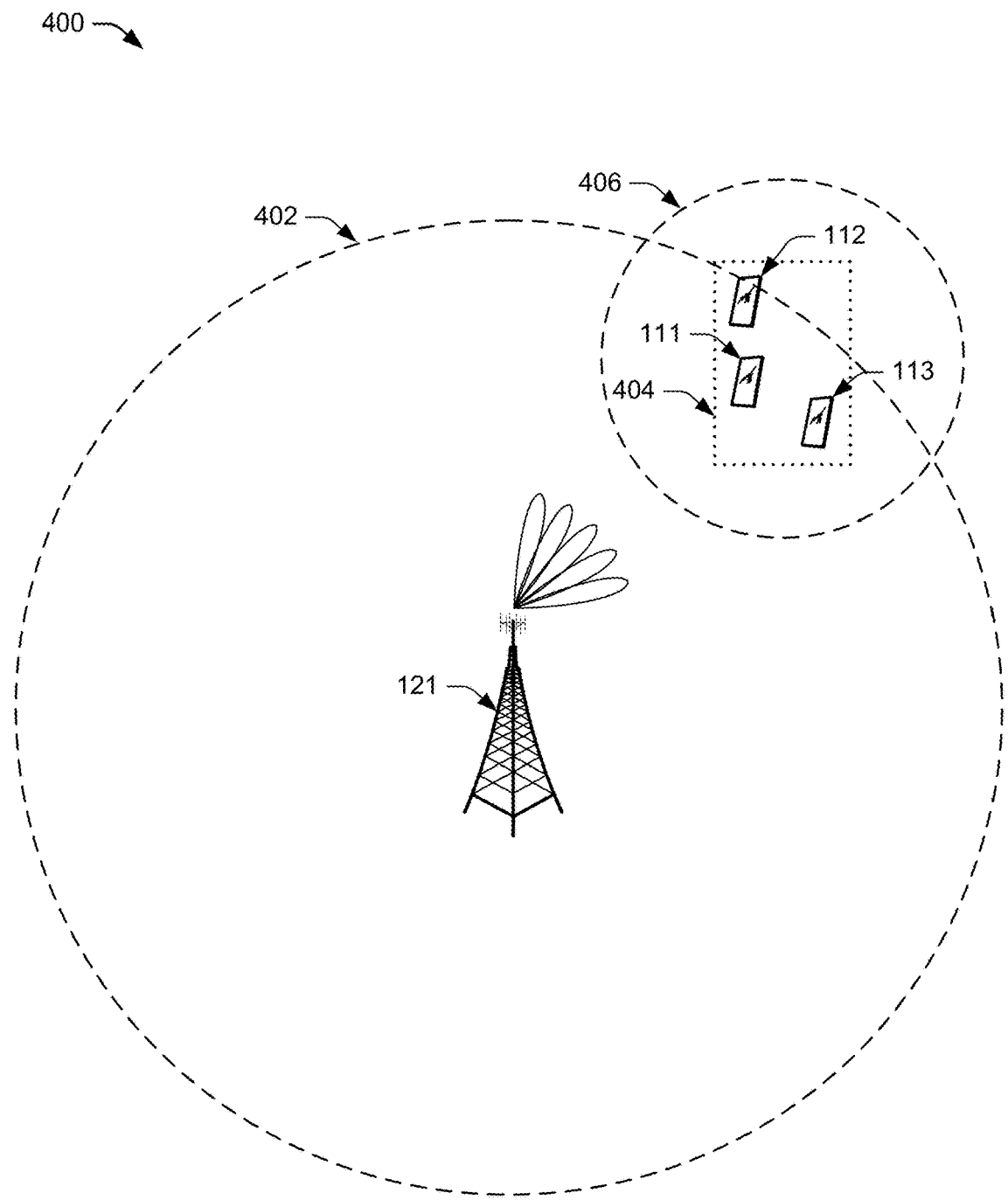
FIG. 4 illustrates an example environment in which various aspects of user-equipment-coordination-set selective participation can be implemented.

FIG. 4 illustrates an example implementation 400 of user-equipment-coordination-set selective participation. The illustrated example includes a base station 121, UE 111, UE 112, and UE 113. Although, for the sake of illustration clarity, the UECS in FIG. 4 is illustrated as including three UEs, any suitable number of UEs may be included in a UECS. In an example, each of the UEs illustrated in FIG. 4 has limited transmit power which may result in difficulty transmitting uplink data to the base station 121. This may be due, at least partially, to the UEs being proximate to a cell edge 402 of the cell provided by the base station 121 or the UEs being in a transmission-challenged location (e.g., a basement, urban canyon, etc.) resulting in a poor link budget between the base station 121 and the UEs. Each of the UEs illustrated in FIG. 4 may also, or alternatively, have limited receiver sensitivity, which may be affected by a poor link budget with the base station 121, as well as multipath reception, interference from in-band or out-of-band sources, attenuation from weather conditions or objects such as buildings, trees, etc.

Using the techniques described herein, the base station 121 can specify a set of UEs (e.g., the UE 111, UE 112, and UE 113) to form a UE-coordination set (e.g., the UE-coordination set 404) for joint transmission and joint reception of data for a target UE (e.g., the UE 112). The base station 121 may determine, based on information corresponding to the UEs (e.g., UE location, signal level, battery level, and so on), whether coordination is beneficial for a particular UE or not. Based on a user input or predefined setting, each of the UEs may opt in or out of participation in the UE-coordination set. An effective transmit power of the target UE 112 can increase significantly (e.g., linearly) with the number of UEs in the UE-coordination set, which can greatly improve a link budget of the target UE 112. The base station 121 may determine a UE-coordination set based on various factors, such as a location of each UE relative to the base station 121, distance between the UEs (such as between each other, between each UE and the target UE, or between each UE and a coordinating UE of the UE-coordination set) or a combination thereof. In some aspects, UEs within a certain distance of each other can more easily coordinate with one another to reduce signal interference when in close proximity by using a local wireless network.

In addition, UE coordination can be based on spatial beams or timing advance, or both, associated with each UE. For example, for beamforming or Massive-MIMO, it may be desirable that all the UEs within the UE-coordination set are able to receive the same signal from the base station. Therefore, all the UEs within the UE-coordination set may be geographically near one another, e.g., within a threshold distance of a particular UE in the UE-coordination set. In this way, the UEs in the UE-coordination set may each be in the same beam or beams that are close to each other. Timing advance may indicate a distance between a UE and the base station. A similar timing advance for each UE in a group indicates that those UEs are approximately the same distance from the base station. UEs within a predefined distance of one another that are all a similar distance from the base station may be capable of working together in a UE-coordination set in a distributed fashion to improve a signal strength and quality to the benefit of a single UE in the UE-coordination set.

The base station can send layer-2 messages (e.g., Medium Access Control layer) and/or layer-3 (e.g., Service Data Adaptation Protocol layer) messages to UEs to direct or request those UEs to join the UE-coordination set. The base station can provide additional data to the UEs within the UE-coordination set to enable the UEs to communicate with at least the coordinating UE or the target UE. The additional data may include an identity of the coordinating UE and/or an identity of the target UE, security information, and/or local wireless network information.

The base station can receive a response message from a UE in the UE-coordination set acknowledging the request message. In some cases, the base station can receive a response message from at least two of the UEs acknowledging that a UE has joined the UE-coordination set. The response message may indicate that the request message has been approved by a user of the UE.

In addition, the base station can identify and command (or request) a specific UE within the UE-coordination set to act as a coordinating UE (e.g., master UE) for the UE-coordination set. For example, the base station 121 can transmit a configuration message (e.g., request message) to the specific UE to request that the specific UE act as the coordinating UE for the UE-coordination set. The specific UE may accept or decline the request based on user input from a user of the UE or a setting that is set to automatically accept or decline such requests. In some aspects, the UE may transmit a UE-capability message or other layer-3 message as a response to the request message from the base station 121. The coordinating UE can coordinate the messages and samples sent between UEs within the UE-coordination set for joint transmission and joint reception. In aspects, the coordinating UE can determine where the joint processing is to occur, e.g., at the coordinating UE or the target UE. In an example, the coordinating UE can coordinate how a particular UE in the UE-coordination set is to send I/Q samples, which the particular UE demodulates from signals received from the base station, to the target UE.

The base station can select the coordinating UE from the group of UEs in the UE-coordination set based on a variety of factors, some of which may be signaled to the base station by the UE using a UE-capability message. For example, one factor includes processing power of the coordinating UE, which provides the coordinating UE the capability to handle certain aspects of the UE-coordination set including central coordination or scheduling. Another factor may include a battery-level state of the coordinating UE. For instance, if a particular UE in the UE-coordination set has a low battery, then that UE may not be a good candidate to act as the coordinating UE. Accordingly, UEs within the UE-coordination set that have a battery-level state above a threshold value may be considered as candidates for selection as the coordinating UE. In one example, the base station may first select one UE as a coordinating UE, and receive, subsequent to formation of the UE-coordination set, messages from the other UEs in the UE-coordination set indicating respective battery-level states. Then, the base station can change the coordination UE if another UE in the UE-coordination set would be a better candidate based on the battery-level states of the UEs in the UE-coordination set.

Yet another factor may include a location of the coordinating UE. The base station may identify the location of the UEs in the UE-coordination set based on various factors, such as angle of arrival of signals from the UE, timing advance, observed time difference of arrival (OTDOA), and so on. An ideal location for the coordinating UE may be geographically central in the UE-coordination set as this may maximize the coordinating UE's capability to coordinate and communicate with the other UEs in the UE-coordination set. However, the coordinating UE is not required to be in a central location of the UEs in the UE-coordination set. Rather, the coordinating UE can be located at any location within the UE-coordination set that allows the coordinating UE to communicate and coordinate with the other UEs in the UE-coordination set. The base station constantly monitors the UE-coordination set and can update the coordinating UE at any time based on updated factors, such as updated UE locations, UE battery-level state, and so on. Or, as mentioned previously, the coordinating UE may transfer its joint processing responsibilities to another UE based on factors such as processing power, battery level, and/or geographic location.

In some aspects, the base station can receive indications from one or more UEs in the UE-coordination set that advertise their capability to act as the coordinating UE. Additionally or alternatively, the base station can receive indications from one or more UEs in the UE-coordination set that indicate a willingness of a user of a respective UE to allow their UE to participate in the UE-coordination set and/or act as the coordinating UE. Accordingly, a UE in the UE-coordination set can indicate, using a layer-3 message, to the base station whether it is capable of acting and/or is permitted to act as the coordinating UE.

In the illustrated example 400 in FIG. 4, the base station 121 may select UE 111 to act as the coordinating UE since the UE 111 is located between UE 112 and UE 113 or because the UE 111 is capable of communicating with each of the other UEs 112 and 113 in the UE-coordination set. The base station 121 may select the coordinating UE for various reasons, examples of which are described above. Being at the cell edge, all three of the UEs 111, 112, 113 have weak cellular signal reception. The base station 121 selects UE 111 to coordinate messages and samples sent between the base station 121 and the UEs 111, 112, 113 for the target UE 112. Communication among the UEs can occur using a local wireless network 406, such as a PAN, NFC, Bluetooth, WiFi-Direct, local mmWave link, etc. In this example, all three of the UEs 111, 112, 113 receive RF signals from the base station 121. The UE 111, UE 112, and UE 113 demodulate the RF signals to produce baseband I/Q analog signals, and sample the baseband I/Q analog signals to produce I/Q samples. The UE 112 and the UE 113 forward the I/Q samples along with system timing information (e.g., system frame number (SFN)) using the local wireless network 406 to the coordinating UE 111 using the local wireless network transceiver 210. The coordinating UE 111 then uses the timing information to synchronize and combine the I/Q samples and processes the combined signal to decode data packets for the target UE 112. The coordinating UE 111 then transmits the data packets to the target UE 112 using the local wireless network 406.

When the target UE 112 has uplink data to send to the base station 121, the target UE transmits the uplink data to the coordinating UE 111 that uses the local wireless network 406 to distribute the uplink data, as I/Q samples, to each UE in the UE-coordination set 404. Each UE in the UE-coordination set 404 synchronizes with the base station 121 for timing information and its data transmission resource assignment. Then, all three UEs in the UE-coordination set 404 jointly transmit the uplink data to the base station 121. The base station 121 receives the jointly transmitted uplink data from the UEs 111, 112, 113 and processes the combined signal to decode the uplink data from the target UE 112.

User Equipment States

Figure 5:
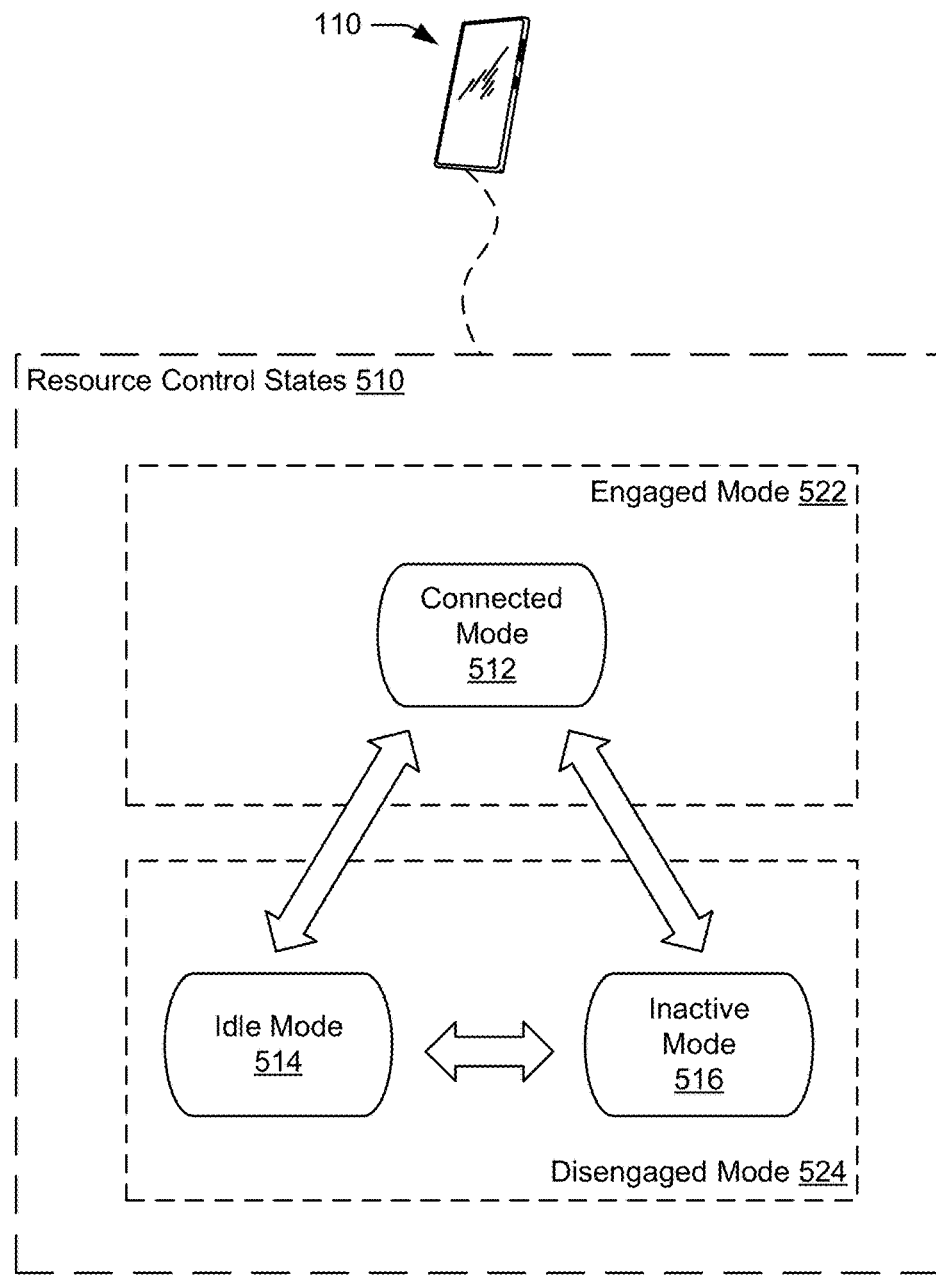
FIG. 5 illustrates example user equipment states which may implement various aspects of user-equipment-coordination-set selective participation.

FIG. 5 illustrates example user equipment states 500 which may benefit from aspects of user-equipment-coordination-set selective participation. A wireless network operator provides its telecommunication services to user equipment devices through a wireless network. To communicate wirelessly with the network, a user equipment 110 utilizes a radio resource control (RRC) procedure to establish a connection to the network via a cell (e.g., a base station, a serving cell). Upon establishing the connection to the network via the base station 121, the UE 110 enters a connected mode (e.g., RRC connected mode, RRC CONNECTED state, NR-RRC CONNECTED state, E-UTRA RRC CONNECTED state).

The UE 110 operates according to different resource control states 410. Different situations may occur that cause the UE 110 to transition between the different resource control states 410 as determined by the radio access technology. Examples of the resource control states 510 illustrated in FIG. 5 include a connected mode 512, an idle mode 514, and an inactive mode 516. A user equipment 110 is either in the connected mode 512 or in the inactive mode 516 when an RRC connection is active. If an RRC connection is not active, then the user equipment 110 is in the idle mode 514.

In establishing an RRC connection, the user equipment 110 may transition from the idle mode 514 to the connected mode 512. After establishing the connection, the user equipment 110 may transition (e.g., upon connection inactivation) from the connected mode 512 to an inactive mode 516 (e.g., RRC inactive mode, RRC_INACTIVE state, NR-RRC INACTIVE state) and the user equipment 110 may transition (e.g., via an RRC connection resume procedure) from the inactive mode 516 to the connected mode 512. After establishing the connection, the user equipment 110 may transition between the connected mode 512 to an idle mode 514 (e.g., RRC idle mode, RRC IDLE state, NR-RRC IDLE state, E-UTRA RRC IDLE state), for instance upon the network releasing the RRC connection. Further, the user equipment 110 may transition between the inactive mode 516 and the idle mode 514.

Further, the UE 110 may be in an engaged mode 522 or may be in a disengaged mode 524. As used herein, an engaged mode 522 is a connected mode (e.g., the connected mode 512) and a disengaged mode 524 is an idle, disconnected, connected-but-inactive, or connected-but-dormant mode (e.g., idle mode 514, inactive mode 516). In some cases, in the disengaged mode 524, the UE 110 may still be Network Access Stratum (NAS) registered with radio bearer active (e.g., inactive mode 516).

Each of the different resource control states 510 may have different quantities or types of resources available, which may affect power consumption within the UE 110. In general, the connected mode 512 represents the UE 110 actively connected to (engaged with) the base station 121. In the inactive mode 516, the UE 110 suspends connectivity with the base station 121 and retains information that enables connectivity with the base station 121 to be quickly re-established. In the idle mode 514 the UE 110 releases the connection with the base station 121.

Some of the resource control states 510 may be limited to certain radio access technologies. For example, the inactive mode 516 may be supported in LTE Release 15 (eLTE), 5G NR, and 6G, but not in 3G or previous generations of 4G standards. Other resource control states may be common or compatible across multiple radio access technologies, such as the connected mode 512 or the idle mode 514.

UE-Coordination-Set Selective Participation

Figure 6:
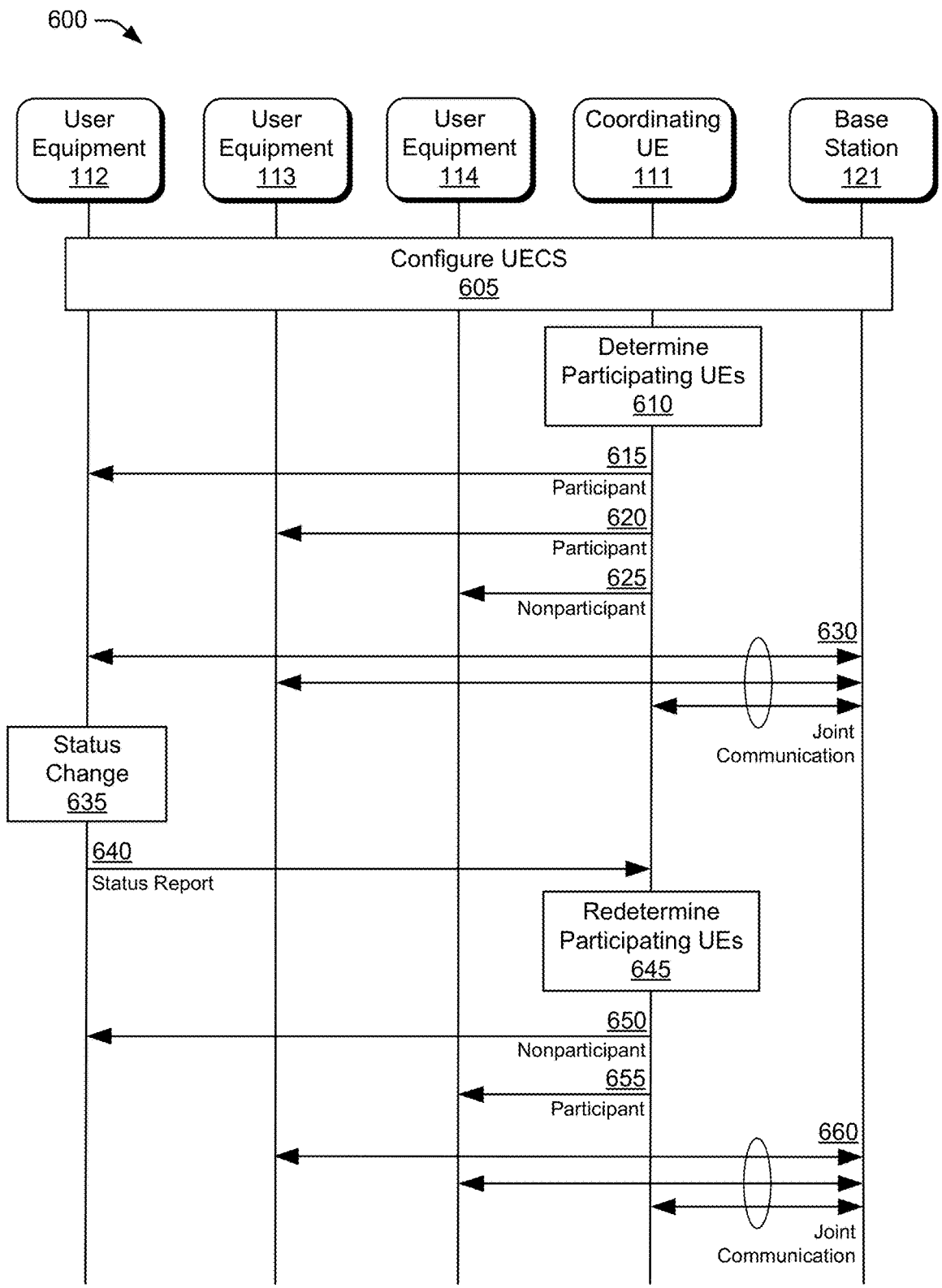
FIG. 6 illustrates example data and control transactions between devices of a user-equipment-coordination set and a base station in accordance with aspects of user-equipment-coordination-set selective participation.

FIG. 6 illustrates data and control transactions between devices of a user-equipment-coordination set and a base station for joint communication participation in a user-equipment-coordination set in accordance with aspects of user-equipment-coordination-set selective participation. Although not illustrated for the sake of illustration clarity, various acknowledgements for messages illustrated in FIG. 6 may be implemented to ensure reliable operations of UECS selective participation.

At 605 and as described above with respect to FIG. 4, the base station 121 configures a UECS (e.g., the UECS 404) including the UE 111, the UE 112, the UE 113, and the UE 114. The base station 121 configures the UE 111 as the coordinating UE for the UECS. Although, for the sake of illustration clarity, the UECS in FIG. 6 is illustrated as including four UEs, any suitable number of UEs may be included in the UECS.

At 610, the coordinating UE 111 determines which UEs in the UECS will participate in joint communication with the base station 121. For example, the coordinating UE 111 determines that the UE 112 and UE 113 will participate in joint communication and that the UE 114 will not participate in joint communication. Alternatively (not illustrated) the base station 121 can determine the UEs that will participate in joint communication and forward an indication of the participant UEs and the nonparticipant UEs to the coordinating UE 111. For example, the base station can send the indication of the participant UEs and the nonparticipant UEs to the coordinating UE 111 in a layer-3 message. The coordinating UE 111 then forwards joint-communication-selection messages to the UEs in the UECS based on the message that is from the base station 121.

At 615 the coordinating UE 111 transmits a joint-communication-selection message to the UE 112 indicting that the UE 112 is to participate in joint communication. The joint-communication-selection message can also include an indication of the type of joint communication (joint transmission, joint reception, or both joint transmission and joint reception) in which the UE 112 will participate.

At 620 the coordinating UE 111 transmits a joint-communication-selection message to the UE 113 indicting that the UE 113 is to participate in joint communication. The joint-communication-selection message can also include an indication of the type of joint communication (joint transmission, joint reception, or both joint transmission and joint reception) in which the UE 113 will participate. The indication of the type of participation for the UE 112 may be the same as or different than the type of participation indicated to the UE 112 at 615.

At 625 the coordinating UE 111 transmits a joint-communication-selection message to the UE 114 indicting that the UE 114 is not to participate in joint communication. The joint-communication-selection message at 615, 620, and 625 are transmitted using a local wireless network such as the local wireless network 406. Optionally or alternatively, the UE 111 can broadcast or multicast a joint-communication-selection message that includes indications for multiple UEs 110 in the UECS in a single joint-communication-selection message.

At 630, the UE 111, the UE 112, and the UE 113 jointly communicate with the base station 121. The joint communication illustrated at 630 can include any combination of the UE 111, the UE 112, and/or the UE 113 jointly receiving, jointly transmitting, or both jointly receiving and transmitting with the base station 121.

At 635, the UE 112 determines that a status change occurs that may affect the participation of the UE 112 in joint communication. For example, the status change can include the battery level of the UE 112 dropping below a threshold value indicating a low-battery condition, the UE 112 has transitioned from the engaged state 522 to the disengaged state 524, or the like.

At 640, the UE 112 transmits a status report message to the coordinating UE 111 (or alternatively the base station 121, not illustrated). The status report message may be transmitted periodically regardless of a change in UE status or the change in status may trigger the UE 112 to transmit the status report message.

At 645, the coordinating UE 111 redetermines which UEs in the UECS will participate in joint communication with the base station 121. For example and based on the received status report, the coordinating UE 111 determines that the UE 112 will not participate in joint communication and that the UE 114 will start to participate in joint communication Alternatively (not illustrated) the base station 121 redetermines which UEs in the UECS will participate in joint communication with the base station 121.

At 650, the coordinating UE 111 transmits a joint-communication-selection message to the UE 112 indicting that the UE 112 is to discontinue participation in joint communication. At 655, the coordinating UE 111 transmits a joint-communication-selection message to the UE 114 indicting that the UE 114 is to participate in joint communication.

At 660, the UE 111, the UE 113, and the UE 114 jointly communicate with the base station 121. The joint communication illustrated at 660 can include any combination of the UE 111, the UE 113, and/or the UE 114 jointly receiving, jointly transmitting, or both jointly receiving and transmitting with the base station 121.

Example Method

Example methods 700 is described with reference to FIG. 7 in accordance with one or more aspects of user-equipment-coordination-set selective participation. The order in which the method blocks are described are not intended to be construed as a limitation, and any number of the described method blocks can be skipped, repeated, or combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 7:
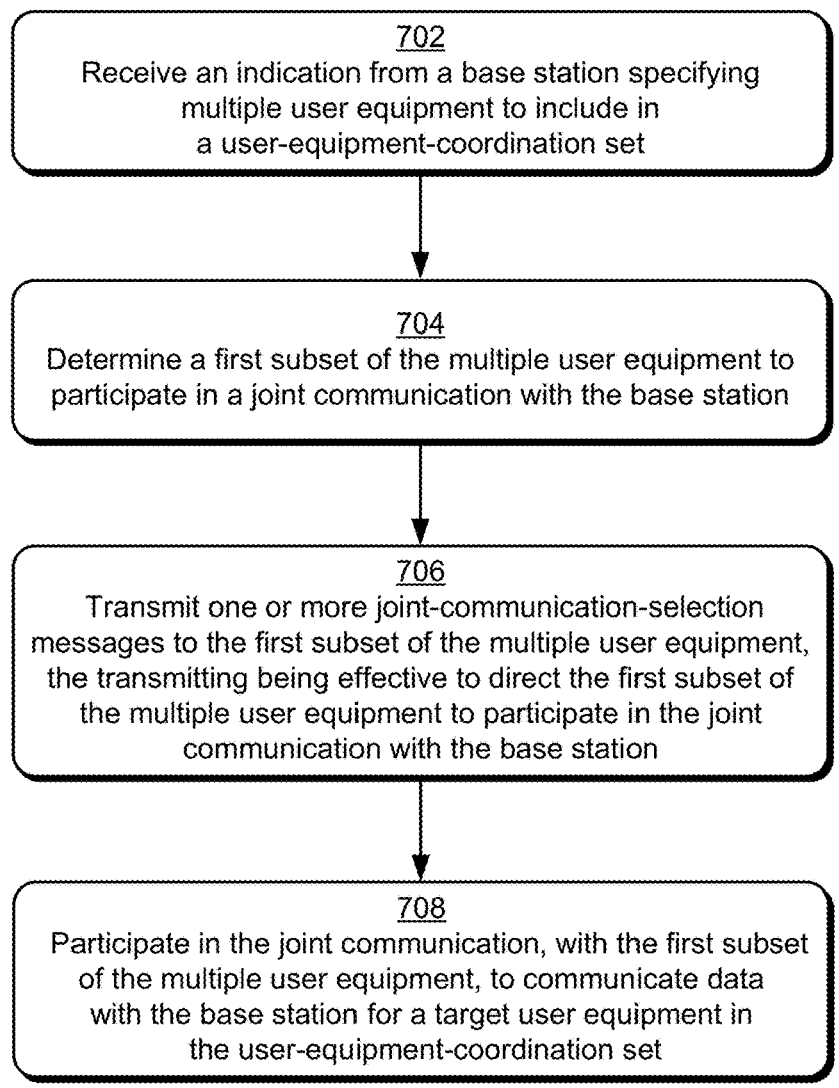
FIG. 7 illustrates an example method of user-equipment-coordination-set selective participation as generally related to the coordinating user equipment in accordance with aspects of the techniques described herein.

FIG. 7 illustrates example method(s) 700 of user-equipment-coordination-set selective participation as generally related to a coordinating user equipment. At block 702, a coordinating user equipment receives an indication from a base station specifying multiple user equipment to include in a user-equipment-coordination set. For example, a coordinating user equipment (e.g., the coordinating UE 111) receives an indication from a base station (e.g., the base station 121) specifying multiple user equipment (e.g., UE 112, UE 113, and UE 114) to include in a user-equipment-coordination set (e.g., the UECS 404).

At block 704, the coordinating user equipment determines a first subset of the multiple user equipment to participate in a joint communication with the base station. For example, the coordinating user equipment determines a first subset of the multiple user equipment to participate in a joint communication with the base station, which may include the coordinating user equipment considering various factors in determining which UEs to include in the first subset, such as whether each UE is in an engaged or disengaged RRC mode, the battery level status of the UE, or the like.

At block 706, the coordinating user equipment transmits one or more joint-communication-selection messages to the first subset of the multiple user equipment, the transmitting being effective to direct the first subset of the multiple user equipment to participate in the joint communication with the base station. For example, the coordinating user equipment transmits one or more joint-communication-selection messages (615, 620) to the first subset of the multiple user equipment, the transmitting being effective to direct the first subset of the multiple user equipment to participate in the joint communication with the base station. The coordinating user equipment can transmit unicast, multicast, or broadcast messages using the local wireless network to direct the UEs to participate in joint communication.

At block 708, the coordinating user equipment participates in joint communication, with the first subset of the multiple user equipment, to communicate data with the base station for a target user equipment in the user-equipment-coordination set. For example, the coordinating user equipment participates in joint communication with the first subset of the multiple user equipment. The coordinating user equipment may communicate samples to the UEs in the first subset for joint transmission, may receive samples from the UEs in the first subset for joint reception, or both.

In the following text, some examples are described.

Example 1: A method for determining participation in a joint communication by a user equipment configured as a coordinating user equipment for a user-equipment-coordination set in a wireless communications network, the method comprising the coordinating user equipment:

receiving an indication from a base station specifying multiple user equipments to include in the user-equipment-coordination set;

determining a first subset of the multiple user equipments to participate in the joint communication with the base station;

transmitting one or more joint-communication-selection messages to the first subset of the multiple user equipments, the transmitting being effective to direct the first subset of the multiple user equipments to participate in the joint communication with the base station; and participating in the joint communication, with the first subset of the multiple user equipments, to communicate data with the base station for a target user equipment in the user-equipment-coordination set.

Example 2: The method of claim 1, further comprising the coordinating user equipment:

determining a second subset of the multiple user equipments, the second subset not participating in the joint communication between the user-equipment-coordination set and the base station; and transmitting one or more joint-communication-selection messages to the second subset of the multiple user equipments, the transmitting being effective to direct the second subset of the multiple user equipments to not participate in the joint communication with the base station.

Example 3: The method of example 2, wherein each user equipment of the second subset of the multiple user equipments is in a disengaged Radio Resource Control mode.

Example 4: The method of example 3, wherein the disengaged Radio Resource Control mode comprises an idle mode and an inactive mode.

Example 5: The method of any preceding example, wherein each user equipment in the first subset of the multiple user equipments is in a connected Radio Resource Control mode.

Example 6: The method of any preceding example, further comprising the coordinating user equipment:

receiving from a first user equipment in the first subset of the multiple user equipments an indication of a change of a status of the first user equipment;

determining to remove the first user equipment from participation in joint communication with the base station; and based on the determining to remove the first user equipment, transmitting a joint-communication-selection message to the first user equipment, the transmitting being effective to direct the first user equipment to discontinue participation in the joint communication with the base station.

Example 7: The method of example 6, wherein the change of the status of the first user equipment is a change from a connected Radio Resource Control mode to a disengaged Radio Resource Control mode.

Example 8: The method of example 6, wherein the indication of the change of the status of the first user equipment is an indication that a battery level of the first user equipment is below a threshold value for battery level.

Example 9: The method of any of examples 6 to 8, further comprising the coordinating user equipment:

based on the determining to remove the first user equipment, selecting a second user equipment that is not in the first subset to participate in the joint communication with the base station; and based on the selecting the second user equipment, transmitting a joint-communication-selection message to the second user equipment, the transmitting being effective to direct the second user equipment to participate in the joint communication with the base station.

Example 10: The method of any preceding example, wherein the transmitting one or more joint-communication-selection messages to the first subset of the multiple user equipments comprises:

transmitting the one or more joint-communication-selection messages to the first subset of the multiple user equipments using a local wireless network.

Example 11: The method of any preceding example, wherein the joint communication comprises:

joint reception;

joint transmission; or joint reception and joint transmission.

Example 12: The method of any one of examples 1 to 10, comprising the coordinating user equipment:

determining that a first portion of the first subset of the multiple user equipments participates in joint reception; and determining that a second portion of the first subset of the multiple user equipments participates in joint transmission.

Example 13: The method of any preceding example, comprising the coordinating user equipment:

determining that a link quality of joint reception has dropped below a minimum threshold value; and selecting an additional user equipment that is not in the first subset to participate in the joint communication with the base station.

Example 14: The method of any preceding example, comprising the coordinating user equipment:

receiving an indication from the base station that a link quality of joint transmission has dropped below a minimum threshold value; and selecting an additional user equipment that is not in the first subset to participate in joint communication with the base station.

Example 15: The method of any preceding example, wherein the determining the first subset of the multiple user equipments to participate in the joint communication with the base station comprises the coordinating user equipment:

creating a schedule for the first subset of the multiple user equipments to participate in the joint communication.

Example 16: The method of example 15, wherein the schedule is based upon one or more factors, and wherein the one or more factors include the battery level of each of the multiple user equipments, a radio resource control mode of each of the multiple user equipments, or both.

Example 17: A user equipment comprising:

a wireless transceiver;

a local wireless network transceiver;

a processor; and instructions for a communication manager application that are executable by the processor to configure the user equipment to perform any one of the methods of examples 1 to 16.

Although aspects of user-equipment-coordination-set selective participation have been described in language specific to features and/or methods, the subject of the appended claims is not necessarily limited to the specific features or methods described. Rather, the specific features and methods are disclosed as example implementations of user-equipment-coordination-set selective participation, and other equivalent features and methods are intended to be within the scope of the appended claims. Further, various different aspects are described, and it is to be appreciated that each described aspect can be implemented independently or in connection with one or more other described aspects.

The invention claimed is:

1. A method for determining participation in a joint communication by a user equipment configured as a coordinating user equipment for a user-equipment-coordination set in a wireless communications network, the method comprising the coordinating user equipment:

receiving an indication from a base station specifying multiple user equipments to include in the user-equipment-coordination set;

determining a first subset of the multiple user equipments to participate in the joint communication with the base station;

transmitting one or more joint-communication-selection messages to the first subset of the multiple user equipments, the transmitting being effective to direct the first subset of the multiple user equipments to participate in the joint communication with the base station;

receiving from a first user equipment in the first subset of the multiple user equipments an indication of a change of a status of the first user equipment; and based on the receiving of the indication of the change of status, transmitting a joint-communication-selection message to the first user equipment, the transmitting being effective to direct the first user equipment to discontinue participation in the joint communication with the base station.

2. The method of claim 1, further comprising the coordinating user equipment:

determining a second subset of the multiple user equipments, the second subset not participating in the joint communication between the user-equipment-coordination set and the base station;

transmitting one or more joint-communication-selection messages to the second subset of the multiple user equipments, the transmitting being effective to direct the second subset of the multiple user equipments to not participate in the joint communication with the base station;

receiving from a first user equipment in the first subset of the multiple user equipments an indication of a change of a status of the first user equipment; and based on the receiving of the indication of the change of status, transmitting a joint-communication-selection message to the first user equipment, the transmitting being effective to direct the first user equipment to discontinue participation in the joint communication with the base station.

3. The method of claim 2, wherein each user equipment of the second subset of the multiple user equipments is in a disengaged Radio Resource Control mode.

4. The method of claim 3, wherein the disengaged Radio Resource Control mode comprises an idle mode and an inactive mode.

5. The method of claim 1, wherein each user equipment in the first subset of the multiple user equipments is in a connected Radio Resource Control mode.

6. The method of claim 1, wherein the change of the status of the first user equipment is a change from a connected Radio Resource Control mode to a disengaged Radio Resource Control mode.

7. The method of claim 1, wherein the indication of the change of the status of the first user equipment is an indication that a battery level of the first user equipment is below a threshold value for the battery level.

8. The method of claim 1, further comprising the coordinating user equipment:
based on the receiving the indication of the change of status, selecting a second user equipment that is not in the first subset to participate in the joint communication with the base station; and
based on the receiving the indication of the change of status, selecting the second user equipment, transmitting a joint-communication-selection message to the second user equipment, the transmitting being effective to direct the second user equipment to participate in the joint communication with the base station.

9. The method of claim 1, wherein the transmitting one or more joint-communication-selection messages to the first subset of the multiple user equipments comprises:
transmitting the one or more joint-communication-selection messages to the first subset of the multiple user equipments using a local wireless network.

10. The method of claim 1, wherein the joint communication comprises:
joint reception;
joint transmission; or
joint reception and joint transmission.

11. The method of claim 1, comprising the coordinating user equipment:
selecting a first portion of the first subset of the multiple user equipments to participate in joint reception; and
selecting a second portion of the first subset of the multiple user equipments to participate in joint transmission.

12. The method of claim 1, comprising the coordinating user equipment:
based on a link quality of joint reception dropping below a minimum threshold value, selecting an additional user equipment that is not in the first subset to participate in the joint communication with the base station.

13. The method of claim 1, comprising the coordinating user equipment:
receiving an indication from the base station that a link quality of joint transmission has dropped below a minimum threshold value; and
selecting an additional user equipment that is not in the first subset to participate in joint communication with the base station.

14. The method of claim 1, wherein the determining the first subset of the multiple user equipments to participate in the joint communication with the base station comprises the coordinating user equipment:
creating a schedule for the first subset of the multiple user equipments to participate in the joint communication.

15. The method of claim 14, wherein the schedule is based upon one or more factors, and wherein the one or more factors include a battery level of each of the multiple user equipments, a radio resource control mode of each of the multiple user equipments, or both.

16. A user equipment comprising:
a wireless transceiver;
a local wireless network transceiver;
a processor; and
instructions for a communication manager application that are executable by the processor to configure the user equipment to:
receive an indication from a base station specifying multiple user equipments to include in a user-equipment-coordination set;
determine a first subset of the multiple user equipments to participate in a joint communication with the base station;
transmit one or more joint-communication-selection messages to the first subset of the multiple user equipments, the transmission being effective to direct the first subset of the multiple user equipments to participate in the joint communication with the base station;
receive from a first user equipment in the first subset of the multiple user equipments an indication of a change of a status of the first user equipment; and
based on the reception of the indication of the change of status, transmit a joint-communication-selection message to the first user equipment, the transmitting being effective to direct the first user equipment to discontinue participation in the joint communication with the base station.

17. The user equipment of claim 16, wherein the instructions are further executable by the processor to configure the user equipment to:
determine a second subset of the multiple user equipments, the second subset not participating in the joint communication between the user-equipment-coordination set and the base station; and
transmit one or more joint-communication-selection messages to the second subset of the multiple user equipments, the transmitting being effective to direct the second subset of the multiple user equipments to not participate in the joint communication with the base station.

18. The user equipment of claim 17, wherein each user equipment of the second subset of the multiple user equipments is in a disengaged Radio Resource Control mode.

19. The user equipment of claim 18, wherein the disengaged Radio Resource Control mode comprises an idle mode and an inactive mode.

20. The user equipment of claim 16, wherein the instructions are further executable by the processor to configure the user equipment to:
participate in the joint communication, with the first subset of the multiple user equipments, to communicate data with the base station for a target user equipment in the user-equipment-coordination set.

21. The method of claim 1, further comprising:
participating in the joint communication, with the first subset of the multiple user equipments, to communicate data with the base station for a target user equipment in the user-equipment-coordination set.

* * * * *